(12) United States Patent
Soeger et al.

(10) Patent No.: US 8,568,678 B2
(45) Date of Patent: Oct. 29, 2013

(54) STRUCTURED SCR CATALYST FOR THE REDUCTION OF NITROGEN OXIDES IN THE EXHAUST GAS FROM LEAN-BURN ENGINES USING AMMONIA AS REDUCING AGENT

(75) Inventors: Nicola Soeger, Frankfurt am Main (DE); Lothar Mussmann, Offenbach (DE); Ralf Sesselmann, Ranstadt (DE); Katja Adelmann, Darmstadt (DE); Wolfgang Schneider, Rodenbach (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 732 days.

(21) Appl. No.: 12/307,696
(22) PCT Filed: Jun. 6, 2007
(86) PCT No.: PCT/EP2007/005006
§ 371 (c)(1),
(2), (4) Date: Jun. 15, 2009
(87) PCT Pub. No.: WO2008/006427
PCT Pub. Date: Jan. 17, 2008

(65) Prior Publication Data
US 2010/0209327 A1    Aug. 19, 2010

(30) Foreign Application Priority Data
Jul. 8, 2006 (DE) .......................... 10 2006 031 724
Sep. 25, 2006 (EP) ..................................... 06019975

(51) Int. Cl.
| | | |
|---|---|---|
| *B01D 53/56* | (2006.01) | |
| *C01B 33/36* | (2006.01) | |
| *B01D 47/00* | (2006.01) | |
| *B01J 8/02* | (2006.01) | |
| *B01J 29/04* | (2006.01) | |
| *B01J 21/00* | (2006.01) | |
| *B01J 21/18* | (2006.01) | |

(52) U.S. Cl.
USPC ........ 423/239.2; 423/700; 423/704; 423/210; 423/213.2; 502/60; 502/100; 502/185; 502/184

(58) Field of Classification Search
None
See application file for complete search history.

(56) References Cited

U.S. PATENT DOCUMENTS

| | | | |
|---|---|---|---|
| 4,961,917 A | 10/1990 | Byrne | |
| 5,409,671 A | 4/1995 | Takemoto | |

(Continued)

FOREIGN PATENT DOCUMENTS

| | | |
|---|---|---|
| DE | 103 60 955 A1 | 7/2005 |
| EP | 0 385 164 B1 | 9/1990 |

(Continued)

OTHER PUBLICATIONS

International Search Report.

*Primary Examiner* — Patricia L Hailey
*Assistant Examiner* — Sheng H Davis
(74) *Attorney, Agent, or Firm* — Smith, Gambrell & Russell, LLP

(57) ABSTRACT

The reductive removal of nitrogen oxides from the exhaust gas from internal combustion engines operated predominantly under lean conditionstakes place in a selective catalytic reduction (SCR) of the nitrogen oxides by means of ammonia or a compound which can be decomposed into ammonia as reducing agent. Conventional SCR catalysts typically have a relatively narrow working temperature window, usually 350° C. to 520° C., in which good nitrogen oxide conversions can be achieved with sufficient selectivity. SCR catalyst formulations whose working window is in the temperature range from 150° C. to 350° C. generally not be used at higher temperatures since they oxidize the ammonia required as reducing 18 agent to nitrogen oxides at above 350° C. To cover the entire exhaust gas temperature range typical of vehicles having been operating internal combustion enginesextending from 200° C. to 600° C., it has therefore mostly been necessary to use complicated exhaust gas systemscontaining a plurality of catalysts having different working temperature ranges. Disclosed is a structured SCR catalyst whose working range extends over a significantly broader temperature window and by means of which complicated exhaust gas units can be considerably simplified, with a saving of components.

9 Claims, 4 Drawing Sheets

(56) References Cited

U.S. PATENT DOCUMENTS

| | | |
|---|---|---|
| 6,914,026 B2 | 7/2005 | Tran et al. |
| 7,198,769 B2 * | 4/2007 | Cichanowicz ............. 423/239.1 |
| 7,563,414 B2 * | 7/2009 | Bruck ........................... 422/180 |
| 2005/0232838 A1 * | 10/2005 | Cichanowicz ............. 423/239.1 |
| 2006/0039843 A1 | 2/2006 | Patchett et al. |
| 2006/0254258 A1 * | 11/2006 | Blakeman et al. .............. 60/286 |
| 2007/0110650 A1 * | 5/2007 | Pfeifer et al. .............. 423/213.5 |
| 2008/0125309 A1 * | 5/2008 | Fujdala et al. .................. 502/74 |

FOREIGN PATENT DOCUMENTS

| | | |
|---|---|---|
| EP | 0 393 905 A2 | 10/1990 |
| EP | 0393905 * | 10/1990 |
| EP | 1 495 804 A1 | 12/2005 |
| EP | 1 795 724 A1 | 6/2007 |
| WO | 97/02886 A | 1/1997 |
| WO | 00/29728 | 5/2000 |
| WO | 2006/022214 A | 3/2006 |

* cited by examiner

STRUCTURED SCR CATALYST FOR THE REDUCTION OF NITROGEN OXIDES IN THE EXHAUST GAS FROM LEAN-BURN ENGINES USING AMMONIA AS REDUCING AGENT

INTRODUCTION AND BACKGROUND

The present invention relates to a structured catalyst for the removal of nitrogen oxides from exhaust gases from internal combustion engines operated predominantly at a lean air/fuel ratio by selective catalytic reduction using ammonia or a compound which can be decomposed into ammonia as reducing agent. Such internal combustion engines are diesel engines and directly injected petrol engines. They are referred to collectively as lean-burn engines.

The exhaust gas from lean-burn engines contains not only the usual pollutant gases carbon monoxide CO, hydrocarbons HC and nitrogen oxides $NO_x$ but also a relatively high proportion of oxygen of up to 15% by volume. Carbon monoxide and hydrocarbons can easily be made nonpolluting by oxidation. The reduction of the nitrogen oxides to nitrogen is significantly more difficult because of the high oxygen content.

A known method of removing nitrogen oxides from exhaust gases in the presence of oxygen is the process of selective catalytic reduction (SCR process) by means of ammonia which can also be generated in situ from a precursor compound such as urea. In this process, comproportionation of the nitrogen oxides with ammonia takes place with formation of nitrogen over a suitable catalyst, referred to as SCR catalyst for short.

Since internal combustion engines are operated in transient driving cycles in the motor vehicle, the SCR catalyst has to ensure very high nitrogen oxide conversions at good selectivity even under widely varying operating conditions. Both complete and selective nitrogen oxide conversion at low temperatures and selective and complete conversion of high concentrations of nitrogen oxide as occur, for example, during full-load driving in very hot exhaust gas have to be ensured. In addition, the widely varying operating conditions present difficulties in the exact metering of ammonia, which should ideally be introduced in a stoichiometric ratio to the nitrogen oxides to be reduced. As a result, severe demands are made on the robustness of the SCR catalyst, i.e. its ability to reduce nitrogen oxides to nitrogen with high conversions and selectivities over a broad temperature window at highly variable space velocities over the catalyst and a fluctuating supply of reducing agent.

EP 0 385 164 B1 describes all-active catalysts for the selective reduction of nitrogen oxides by means of ammonia, which contain titanium oxide and at least one oxide of tungsten, silicon, boron, aluminum, phosphorus, zirconium, barium, yttrium, lanthanum and cerium together with an additional component selected from the group of oxides of vanadium, niobium, molybdenum, iron and copper.

U.S. Pat. No. 4,961,917 claims catalyst formulations for the reduction of nitrogen oxides by means of ammonia, which contain zeolites having a silica:alumina ratio of at least 10 and a pore structure which is linked in three dimensions by pores having an average kinetic pore diameter of at least 7 Angstrom together with iron and/or copper as promoters. EP 1 495 804 and U.S. Pat. No. 6,914,026 disclose methods of improving the stability of such zeolite-based systems under hydrothermal aging conditions.

The SCR catalyst formulations described in the documents mentioned, which represent the present prior art, all display good nitrogen oxide conversions only above 350° C. In general, the reaction proceeds optimally only in a relatively narrow temperature range. This conversion optimum is typical of SCR catalysts and is due to the mode of operation of the catalysts.

As a result of the optimal stoichiometry of the reaction, the reduction of a 1:1 molar mixture of nitrogen monoxide NO and nitrogen dioxide $NO_2$ with ammonia $NH_3$ proceeds many times as quickly as the reduction of pure nitrogen monoxide NO. The nitrogen oxides $NO_x$ present in the exhaust gas from lean-burn engines comprise predominantly NO and have only small proportions of $NO_2$. However, since the oxidation of NO to $NO_2$ has to be promoted kinetically by an oxidation catalyst at temperatures below 300° C., SCR catalysts do not display any significant conversions in the low-temperature range if they do not have a certain oxidizing power. On the other hand, an excessively high oxidizing power at temperatures above 350° C. leads to ammonia being oxidized by the high oxygen content of the exhaust gas from lean-burn engines to form lower-valent nitrogen oxides such as nitrous oxide $N_2O$. This firstly results in loss of the reducing agent required for the SCR reaction and, secondly, $NO_x$ in the form of the undesirable secondary emission $N_2O$ is formed. This leads overall to a significant limitation of the operating window of low-temperature SCR catalysts to a very narrow temperature range. For example, SCR catalysts containing noble metals display very high $NO_x$ conversions in the range from 100 to 250° C., but the temperature range in which the catalyst operates with satisfactory selectivity to nitrogen is generally restricted to from 20 to 50° C.

The conflict in terms of objectives between an oxidizing power which is too high and consequently a lack of selectivity and an oxidizing power which is too low and therefore unsatisfactory lower-temperature activity is the reason why SCR catalysts such as the formulations mentioned in EP 0 385 164 B1 or U.S. Pat. No. 4,961,917 have to be used either in combination with an upstream oxidation catalyst or/and in combination with a further catalyst capable of reducing nitrogen oxides for removing nitrogen oxides from the exhaust gas from lean-burn engines in order to be able to ensure removal of the nitrogen oxides at all operating temperatures which occur during driving operation, which are in the range from 200° C. and 600° C. The supplementary catalyst capable of reducing nitrogen oxides can be a low-temperature SCR catalyst, a nitrogen oxide storage catalyst, an HC-DeNOx catalyst or another suitable, reduction-active catalyst technology or combinations thereof.

For example US 2006/0039843 discloses such a system solution. Paragraph [0062] describes, as advantageous embodiment, a system for purifying exhaust gas, in which a substrate coated with an SCR catalyst is arranged between the reducing agent injector and a catalyst support which is coated with an SCR catalyst and an ammonia decomposition catalyst. The SCR catalyst formulations are, in a preferred embodiment according to this text, selected so that the first catalyst operates optimally at relatively high operating temperatures while the second catalyst is more suitable for use in cooler segments of the exhaust gas system.

DE 103 60 955 A1 describes an exhaust gas purification unit for an internal combustion engine, in which ammonia utilized as reducing agent in the SCR reaction is generated from appropriate exhaust gas constituents over a first (in the flow direction) catalyst when a rich exhaust gas composition is present. The ammonia generated by the first catalyst is stored temporarily on a second (in the flow direction) catalyst in the case of a rich exhaust gas composition. In the case of a lean exhaust gas composition, the nitrogen oxides present in the exhaust gas are reduced using the temporarily stored ammonia. Downstream of the second catalyst, there is a third, noble metal-containing catalyst which comprises at least one of the platinum group metals Pt, Pd or Rh on support materials which are able to store ammonia in the case of a rich exhaust gas composition and liberate ammonia in the case of a lean exhaust gas composition. According to this document, the temperature activity ranges of the standard SCR catalyst used in the second position and the noble metal-containing catalyst complement one another so that the proposed exhaust gas purification unit is able to increase the nitrogen oxide conversion considerably, especially at low temperatures.

Although such system solutions ensure that the nitrogen oxides present in the exhaust gas from the lean-burn engine are largely removed in transient operation of the engine, they have considerable disadvantages. Thus, space has to be provided in the vehicle for installation of all catalysts required. Furthermore, each catalyst generates a measurable exhaust gas counterpressure which leads to reductions in the engine power available for operating the vehicle and thus ultimately to increased fuel consumption. In addition, such system solutions require complicated studies on the vehicle application during the development phase of a vehicle so as to ensure that all catalysts are arranged in an optimal position with regard to conversion and selectivity behavior. Here, the optimal position of the catalysts is critically dependent on the achievable operating temperatures and thus firstly on the distance from the engine and secondly on the heat losses in the exhaust gas unit. Of course, each further component incurs higher costs.

In paragraph [0021] of the abovementioned document DE 103 60 955, it is proposed that, in order to minimize the pressure drop, the third, noble-metal containing catalyst be applied to an outflow-end zone of the second catalyst, with this zone covering from 5 to 50% of the total length L of the second catalyst.

The proposed solution reduces the difficulties caused by the configuration as a system to only a limited extent. Since the third catalyst configured as an outflow-end zone of the second catalyst is a noble metal-containing catalyst and, as a result of its high oxidizing power, displays unsatisfactory selectivity to nitrogen at temperatures above 250° C., high $N_2O$ secondary emissions are to be expected above this temperature.

SUMMARY OF THE INVENTION

It is thus an object of the present invention to provide a catalyst for the selective catalytic reduction of nitrogen oxides by means of ammonia or a compound which decomposes into ammonia, which displays good SCR activity in the temperature range below 350° C. while maintaining the desired SCR activity and selectivity as completely as possible in the temperature range above 350° C. In particular, it is an object of the present invention to provide a catalytically active component which despite a widening of the activity window into the low-temperature range causes no significantly increased $N_2O$ secondary emissions.

This object is achieved by a structured SCR catalyst which is composed of a plurality of catalytically active material zones which are contacted in succession by the exhaust gas. These material zones are arranged on support body which can be catalytically inert or can itself represent a catalytically active material zone. They are distinguished by different conversion profiles in the SCR reaction: the conversion profile of the material zone which first comes into contact with the exhaust gas to be purified is at higher temperatures than the conversion profile of a material zone which is subsequently contacted by the exhaust gas to be purified. The zone of the catalyst which first comes into contact with the exhaust gas comprises iron-exchanged zeolites and the material zone which is subsequently contacted by the exhaust gas to be purified comprises a transition metal-exchanged zeolite or a transition metal oxide selected from the group consisting of vanadium pentoxide, tungsten trioxide and titanium dioxide or combinations thereof or a transition metal-exchanged zeolite and a transition metal oxide selected from the group consisting of vanadium pentoxide, tungsten trioxide and titanium dioxide or combinations thereof.

In its preferred embodiments, the catalyst of the invention does not contain a platinum group metal, in particular not platinum, palladium or rhodium.

Before an introductory explanation of the invention, some terms which are of importance to the invention will be defined below.

For the purposes of the present patent text, the conversion profile of a catalyst is the optimal operating temperature window of an SCR catalyst in the freshly produced state, i.e. the temperature range in which maximum nitrogen oxide conversions are achieved with minimum demands on the selectivity of the catalyst. The limits of this temperature range are set with the aid of two temperature-dependent conversion values which are determined by the maximum conversion of the freshly produced catalyst measured under the chosen operating conditions. In the lower temperature range, the light-off behavior of the catalyst and its oxidizing power determine the performance. In a manner analogous to the terminology of the "light-off behavior" which is customary and well known to those skilled in the art for characterizing oxidation catalysts, a $T_{50}$ value is set as lower limit of the conversion profile. This is the temperature at which 50% of the maximum conversion characteristic of the catalyst is achieved under the operating conditions selected. In the upper temperature range, the conversion is limited, in particular, by the formation of nitrogen oxides resulting from overoxidation of ammonia. The temperature at which 90% of the maximum conversion characteristic of the catalyst under the operating conditions selected is exceeded is selected as upper limit of the conversion profile. In view of the high selectivity requirements and taking into account the fact of the nitrous oxide $N_2O$ formed from the overoxidation of ammonia represents an undesirable secondary emission, the temperature range defined as conversion profile is restricted further when the $N_2O$ content measured downstream of the catalyst exceeds a critical limit. In the studies carried out by the applicant, a maximum value of 25 ppm is considered to be acceptable under the operating conditions selected.

For illustration, the conversion profiles of two conventional SCR catalysts which are described in the two comparative examples are shown in FIG. 1. The conversion profile of VK1 is shown by the area denoted by (| | |) and encompasses the temperature range from 225° C. to >500° C. The conversion profile of VK2, shown by the area denoted by (≡) is limited at the lower end by an $N_2O$ content increasing to above 25 ppm downstream of the catalyst and encompasses the temperature range from 175° C. to 310° C.

For the purposes of the present patent text, a catalytically active material zone is a material region which is present in the catalyst and can be seen as a closed zone under a scanning electron microscope. This can be the catalytically active coating on an inert support body. This coating can in turn be made up of a plurality of catalytically active material zones if it comprises, for example, a plurality of layers of different materials. To give a better understanding of the concept of the material zone, FIG. 2 shows part of a scanning electron micrograph of the inflow cross section of a catalyst which comprises an inert honeycomb body having a catalytically active coating. The reference numeral (3) denotes the honeycomb body used as inert support body. The reference numerals (1) and (2) show the material zones having different catalytic activity of which the coating is composed. The broken lines drawn in indicate the boundaries of the material zones.

Furthermore, a material zone can be a support body on which a coating comprising one or, if appropriate, more than one material zones can have been applied, provided that the support itself displays catalytic activity in the SCR reaction.

The structured SCR catalyst of the invention is composed of a plurality of catalytically active material zones, with the conversion profile of the material zone which is contacted first by the exhaust gas to be purified being at higher temperatures than the conversion profile of the material zone which is contacted subsequently by the exhaust gas to be purified.

In a preferred embodiment of the invention, the conversion profile of the material zone which is contacted first by the exhaust gas is from 350° C. to 500° C. Such a conversion profile is typical of SCR catalysts containing iron-exchanged zeolites. The conversion profile of the material zone which is contacted subsequently by the exhaust gas is preferably in the temperature range from 100° C. to 400° C., particularly preferably in the temperature range from 200° C. to 350° C. This material zone contains, according to the invention, transition metal-exchanged zeolites and/or transition metal oxides selected from the group consisting of vanadium pentoxide, tungsten trioxide and titanium dioxide. As transition metal present in the zeolite, preference is given here to a metal from the group consisting of copper, manganese, cobalt, nickel, silver and gold or combinations thereof. Very particular preference is given to copper.

Such an arrangement of the material zones characterized by their conversion profile ensures a significant increase in the nitrogen oxide conversion in the temperature range below 350° C. without appreciable decreases in the selectivity occurring in the temperature range above 350° C. as a result of overoxidation of ammonia to low-valent nitrogen oxides. The conversion profile typical for the SCR catalyst can consequently be broadened additively by a significant temperature range below 350° C. The additive broadening of the conversion profile of the catalyst of the invention presumably results from one of the material zones, depending in each case on the operating temperature of the catalyst, not contributing significantly to the nitrogen oxide conversion but at the same time also not decreasing the selectivity but acting as an effectively inert material.

The arrangement of the material zones having the composition according to the invention cannot be chosen freely. The reverse arrangement of the material zones in which the exhaust gas to be purified firstly contacts the material zone having a conversion profile at relatively low temperatures does not meet the objective since the achievable conversions decrease significantly compared to the arrangement according to the invention.

The material zones can be arranged either horizontally or vertically relative to one another. FIG. 3 shows the embodiment according to the invention. Here, the parts A and B of the figure show embodiments with the material zones arranged above one another (vertical). Parts C and F of the figure show embodiments with a horizontal arrangement, i.e. the material zones are arranged in succession in the flow direction of the exhaust gas. The reference numeral (4) denotes the material zone which is contacted first by the exhaust gas and has a conversion profile at relatively high temperatures. The reference numerals (5) and (7) denote material zones which are contacted subsequently by the exhaust gas and have a conversion profile at lower temperatures, with reference numeral (7) being used only for the special case in which the material zone which is contacted subsequently is a support body which is catalytically active in the SCR reaction. Reference numeral (6) denotes an inert support body. The region (8) defined by two triangular areas bounded by broken lines in part C of the figure denotes an overlap region of the material zones (4) and (5). The free area denoted by reference numeral (9) in part E of the figure represents an uncoated intermediate zone between two material zones on an inert support body.

Vertical arrangements as in FIG. 3B are always suitable when all-active catalysts which have a conversion profile at relatively low temperatures and simultaneously serve as support bodies for a further catalytically active coating having a conversion profile at higher temperature (4) are used as material zone (7) which is to be contacted subsequently by the exhaust gas. As an alternative, an inert support body (6) can firstly be coated with a catalytically active coating having a conversion profile at relatively low temperatures (5) and the resulting "low-temperature SCR catalyst" can be used as support body for a catalytically active coating (4) which displays good SCR activity and selectivity at higher temperatures. This results in the embodiment shown in FIG. 3A.

In the choice of the preferred spatial arrangement of the layers, applicative aspects also have to be taken into account. In the case of an arrangement of the layers vertically above one another as shown in FIGS. 3A and 3B, it has to be remembered that adverse interactions between the material zones cannot be ruled out at high temperatures. For example, thermally induced migration of transition metal atoms from (5) or (7) into (4) can adversely affect the selectivity of the system since such ion migration leads to an undesirable increase in the oxidizing power of the material zone which is contacted first by the exhaust gas, with the consequence of increased overoxidation of ammonia at relatively high operating temperatures.

One possible way of preventing this is to arrange a further coating which acts as diffusion barrier to the transition metal atoms between the material zones (5) and (4) or (7) and (4). The action of such a diffusion barrier can, depending on the material used and the purification task of a structured automobile exhaust gas catalyst, be based on a mechanical or chemical barrier action. Preference is given to diffusion barriers having a chemical barrier action.

In a particularly preferred embodiment of the present invention, a diffusion barrier which has a chemical barrier action and comprises predominantly unexchanged zeolites, known as H-zeolites, and/or ammonium-exchanged zeolites is arranged between the vertically superposed material zones (5) and (4) or (7) and (4) (FIGS. 3A and 3B). The action of H-zeolites is based on transition metal atoms which undergo thermally induced migration from a catalytically active coating into the zeolytic barrier layer being chemically bound in the pores of the zeolite. This results in ion exchange in the solid which leads to liberation of the faster-moving, smaller protons. The transition metal atoms are firmly bound chemically at the adsorption sites of the protons. Their migration is stopped in this way. Only when all proton adsorption sites in the zeolytic barrier layer have been occupied by the transition metal and an accumulation at the interface to the adjacent catalytically active layer occurs as a result of further migration into the barrier layer and the threshold concentration is exceeded does the diffusion barrier loose its effectiveness. This point can be prevented by appropriate dimensioning of the diffusion barrier according to the concentration of the transition metal atoms in the catalytically active coating.

If transition metal atoms migrate from the adjacent catalytically active coating into a barrier layer of ammonium-exchanged zeolite, ammonia is liberated in addition to protons. This is firstly temporarily stored in the cage structure of the zeolite and can be used for reduction of nitrogen oxides in the selective catalytic reduction. Furthermore, hydrocarbon molecules from the exhaust gas can be temporarily stored both in the cage structure of H-zeolites and in the cage structure of ammonium-exchange zeolites. These are then likewise available as reducing agents.

If the material zones are arranged horizontally, i.e. in succession in the flow direction of the exhaust gas (FIGS. 3C to 3F), the contact area of the material zones is significantly reduced even at the point of overlap (FIG. 3C). This also significantly reduces the probability of transition metal atoms migrating through the interface from (5) or (7) into (4). Here, the overlap region of the material zones (8) must not exceed a longitudinal distance of 5 millimeters in the flow direction of the catalyst.

If overlap of the material zones can be avoided completely, as shown in FIGS. 3D and 3E, impairment of the selectivity of the catalyst of the invention by diffusion of transition metal atoms from layer (5) into layer (4) does not have to be feared. These embodiments therefore display improved aging stability compared to the variants 3A, 3B, 3C and 3F and are therefore very particularly preferred. The distance between the material zones (9) should not be greater than 5 millimeters in the flow direction of the catalyst for reasons of effective utilization of installation space.

If the material zones are arranged in succession in the flow direction, the length ratio of the material zones is likewise an optimization opportunity determined by the application. If the structured SCR catalyst of the invention is intended for use in a vehicle having rather low combustion temperatures, e.g. a diesel vehicle, or for positioning in a relatively cool position far removed from the engine in the exhaust gas unit so that the operating temperatures of the catalyst generally do not exceed 350° C., the material zone which is contacted subsequently by the exhaust gas to be purified has to make up the largest proportion of the length of catalyst. In such applications, preference is given to arrangements having a ratio of the material zones (4):(5) of from 5:95 to 45:55, particularly preferably from 10:90 to 25:75. The reason for this is that the material zone (4) which preferably contains an iron-exchanged zeolite stores ammonia even at low temperatures but gives this off again only slowly at temperatures below 350° C. If the ammonia storage has dimensions larger than that of the material zone which is contacted first by the exhaust gas, the ammonia necessary for the reaction will be held back from the downstream material zone which takes on the purification tasks in this temperature range. The conversions decrease.

If the structured SCR catalyst of the invention is intended for use in a motor vehicle having higher combustion temperatures, for example a vehicle having a lean-burn, directly injected petrol engine, or for installation in a position close to the engine, the material zone (4) which preferably contains iron-exchanged zeolite has to make up the main part of the coating. If, as is not unusual in such applications, the operating temperatures of the catalyst are generally above 350° C., very complete conversion of the nitrogen oxides in the first material zone in combination with a very low ammonia breakthrough has to be ensured. The nitrogen oxides breaking through the first material zone can no longer be reacted satisfactorily in the subsequent material zone because of their conversion profile. In addition, ammonia which breaks through would be overoxidized to further nitrogen oxides because of the decrease in selectivity. If the material zone which is contacted second by the exhaust gas is appropriately dimensioned, its oxidizing power can be exploited positively as ammonia barrier catalyst and can contribute to a further component saving in the exhaust gas system. In relatively hot applications, preference is given to arrangements having a ratio of the material zones (4):(5) of from 95:5 to 55:45, particularly preferably from 90:10 to 75:25.

The invention is illustrated below with the aid of two comparative examples, two examples and FIGS. 1 to 7. The figures show

Figure 1:
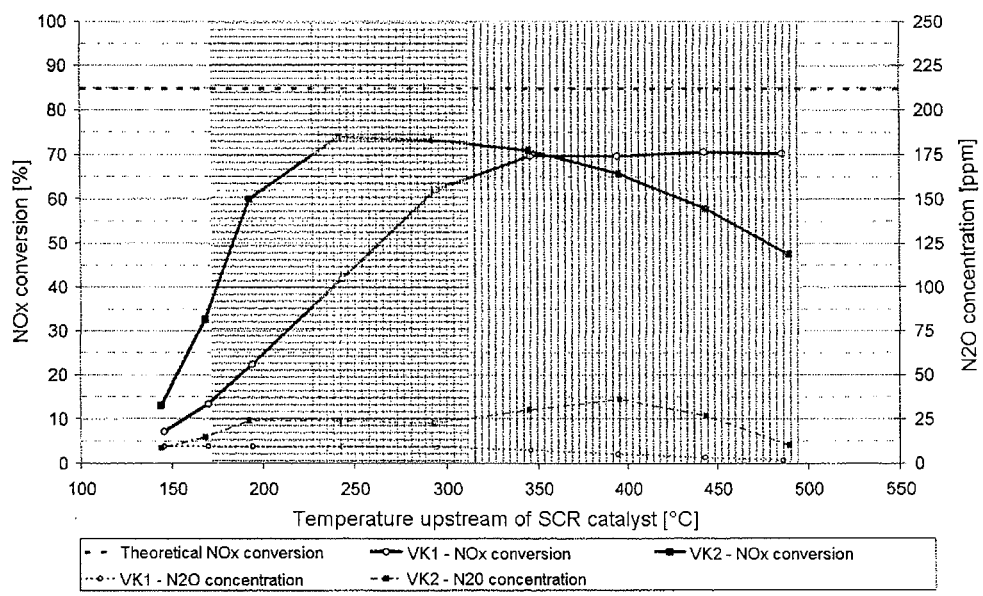
FIG. 1: Conversion profile of two conventional SCR catalysts.
Figure 2:
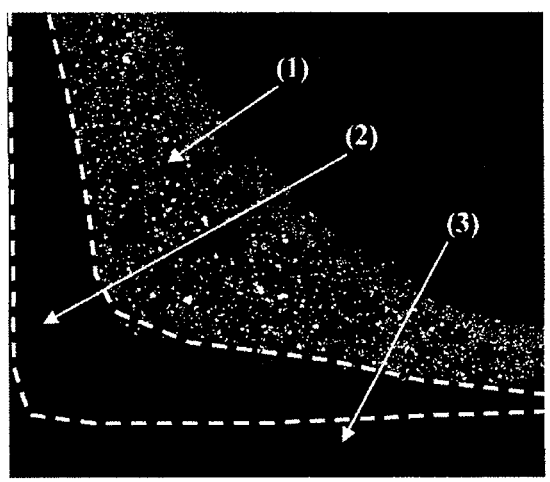
FIG. 2: Part of a scanning electron micrograph of the cross section through an inert honeycomb body (3) having an applied coating comprising two material zones (1) and (2).

Here, the reference numeral
- (4) denotes the material zone which is contacted first by the exhaust gas and has a conversion profile at relatively high temperatures.
- (5) denotes the material zone which is contacted subsequently by the exhaust gas and has a conversion profile at relatively low temperatures if it is not a support body which is catalytically active in the SCR reaction.
- (6) denotes an inert support body.
- (7) denotes a support body which is catalytically active in the SCR reaction as material zone which is contacted subsequently by the exhaust gas and has a conversion profile at relatively low temperatures.
- (8) denotes the overlap region of the material zones.
- (9) denotes an uncoated intermediate zone.

Figure 3:
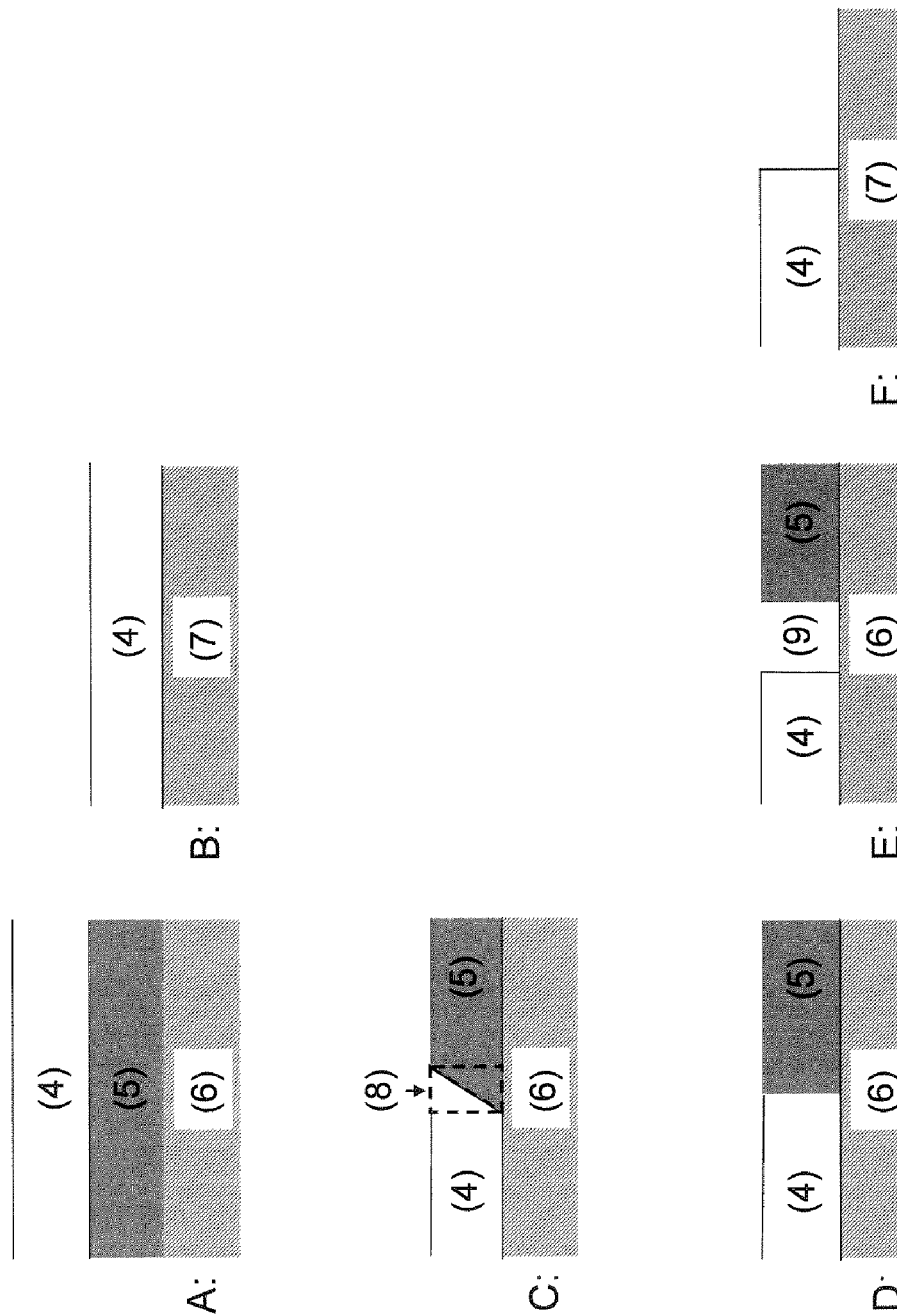
FIG. 3: Preferred embodiments of the structured SCR catalysts according to the invention which differ in respect of the spatial arrangement of the material zones.

The various parts of the images show, as preferred embodiments of catalysts according to the invention,
- A and B: the possible vertical arrangements of two material zones.
- C: the horizontal arrangement of two material zones on an inert support body with overlap region;
- D and E: the horizontal arrangement of two material zones on an inert support body without overlap region;
- F: the horizontal arrangement of two material zones having a partial overlap region when the material zone contacted subsequently by the exhaust gas is a support body which is catalytically active in the SCR reaction.
- FIG. 3 has neither comprehensive nor exclusive character in terms of the depicted embodiments of the catalysts according to the invention. The depiction is illustrative.

Figure 4:
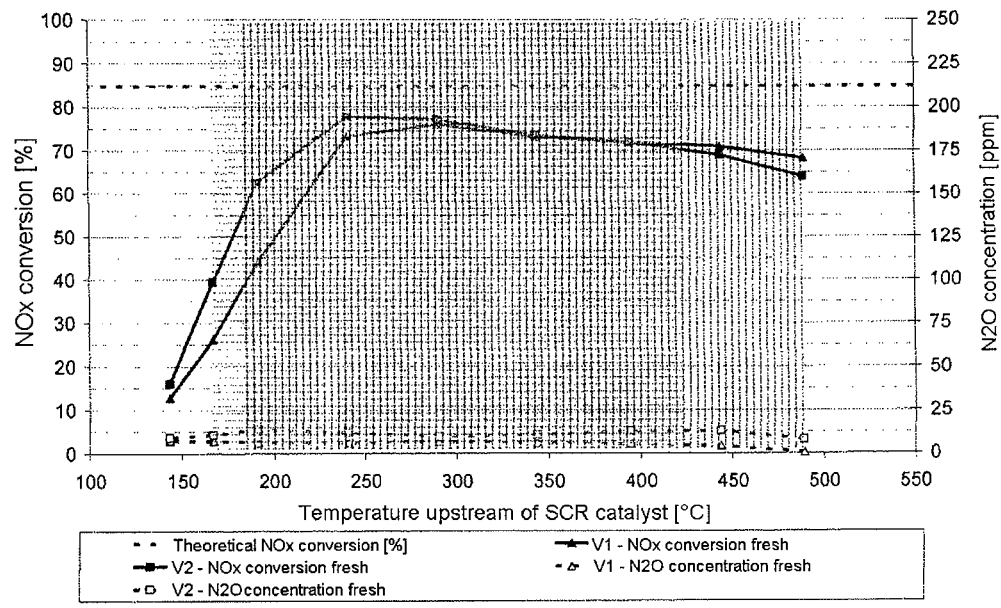

FIG. 4: Conversion profiles of two freshly produced structured SCR catalysts according to the invention with vertical arrangement of the material zones.

Figure 5:
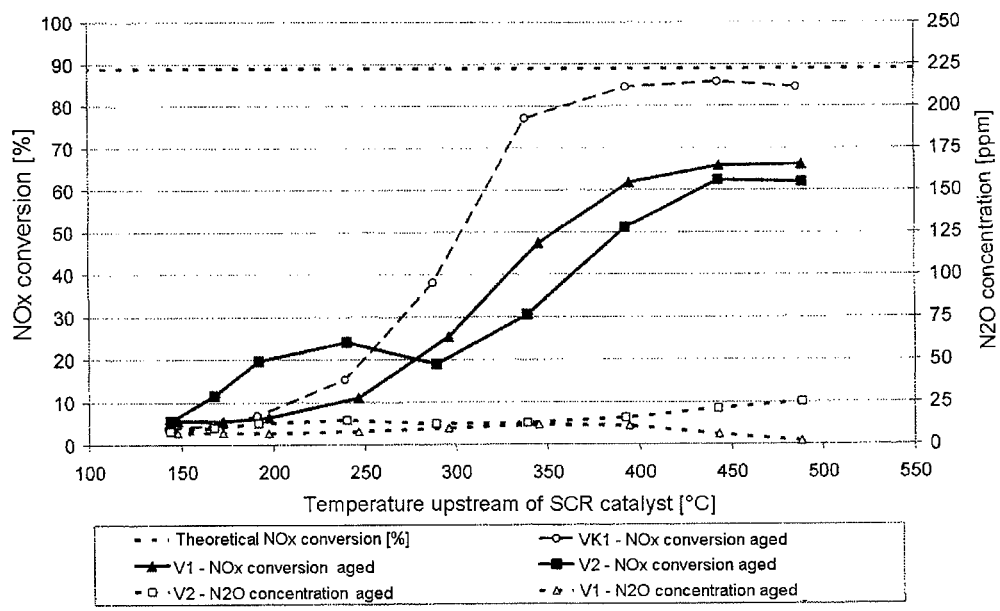

FIG. 5: Nitrogen oxide conversions of two structured SCR catalysts according to the invention with vertical arrangement of the material zones and of a conventional SCR catalyst after hydrothermal aging.

Figure 6:
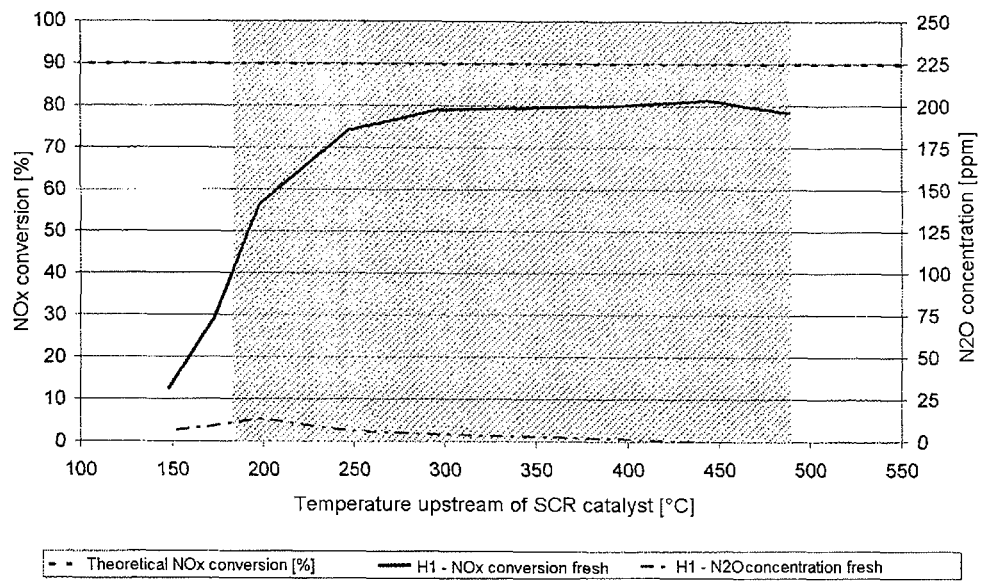

FIG. 6: Conversion profile of a structured SCR catalyst according to the invention having a horizontal arrangement of the material zones in the freshly produced state.

Figure 7:
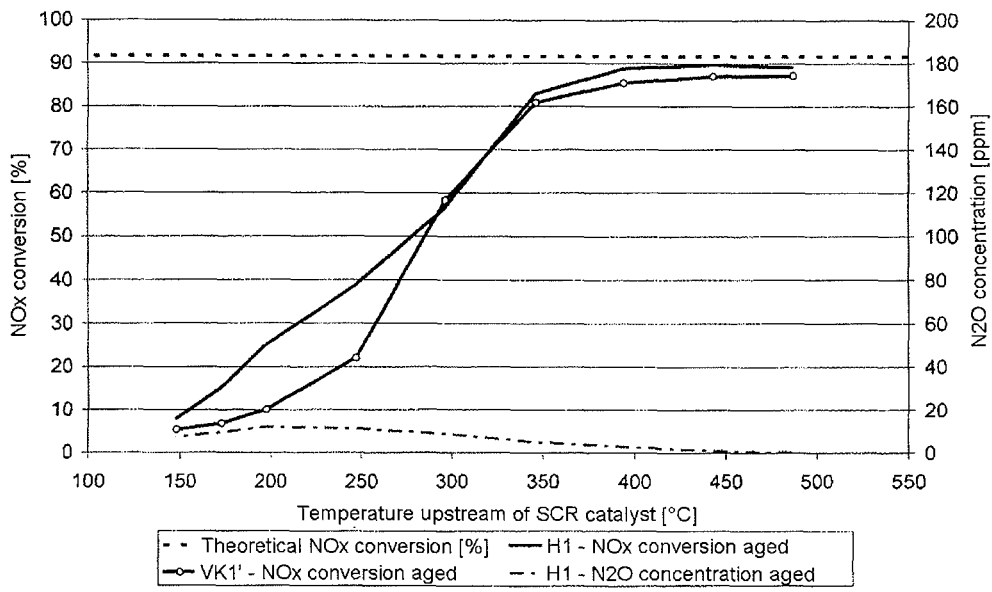

FIG. 7: Nitrogen oxide conversion of a structured SCR catalyst according to the invention with a horizontal arrangement of the material zones and of a conventional SCR catalyst after hydrothermal aging.

DETAILED EMBODIMENTS OF INVENTION

COMPARATIVE EXAMPLE 1

In this comparative example, the conversion profile of a conventional SCR catalyst based on iron-exchanged zeolites was examined. Such catalysts typically display a conversion profile with maximum conversions at temperatures above 300° C. To produce this comparative catalyst, which will hereinafter be designated as VK 1, 6.4 g of a catalytically active coating composed of iron-exchanged zeolites were applied to an inert ceramic honeycomb body. The volume of the honeycomb body was 0.04 l. It had 62 cells per cm² with a wall thickness of 0.17 mm.

The conversion profile was examined in a stationary test on a model gas unit using the following gas concentrations:

| Model gas component: | Concentration: |
| --- | --- |
| NO | 500 ppm |
| $NH_3$ | 425 ppm |
| $O_2$ | 5% by volume |
| $H_2O$ | 1.3% by volume |
| $N_2$ | Balance |

The molar ratio of ammonia to the nitrogen oxides is usually denoted by alpha in studies on SCR activity:

$$\alpha = \frac{c(NH_3)}{c(NO_x)}$$

The gas concentrations shown in the table give an alpha value of α=0.85. The space velocity in the model gas tests carried out was 30 000 h⁻¹.

The result of the studies is shown in FIG. 1. Here, the curves denoted by (○) show the results for VK1. In the freshly produced state, the catalyst achieves a maximum nitrogen oxide conversion of 70% at temperatures in the range from 350° C. to 500° C. Since no decrease in the conversion is observed at 500° C., it can be seen that the conversion level of about 70% can also be maintained at higher temperatures. Below 350° C., the conversions increase slowly and virtually linearly with temperature. $T_{50}$ is 225° C. The $N_2O$ content downstream of the catalyst caused by overoxidation of ammonia is below 10 ppm over the entire temperature window and is thus not relevant for determining the conversion profile.

Accordingly, the conversion profile in the sense of this patent application which is typical for VK1 encompasses the temperature range of from 225° C. to >500° C. denoted by (| |).

COMPARATIVE EXAMPLE 2

In this comparative example, the conversion profile of a conventional SCR catalyst based on copper-exchanged zeolites was examined. Such catalysts generally display, according to the experience of the applicant, a conversion profile at temperatures below 350° C. due to the higher oxidizing action of copper. To produce this comparative catalyst, which will hereinafter be designated as VK 2, 10 g of a catalytically active coating comprising copper-exchanged zeolites was applied to an inert ceramic honeycomb body. The volume of the honeycomb body was likewise 0.04 l. It had 62 cells per cm² with a wall thickness of 0.17 mm.

The catalyst was examined in a stationary test on a model gas unit under the same conditions as in comparative example 1.

The result of the studies is shown in FIG. 1. Here, the curves denoted by (■) show the results for VK2. In the freshly produced state, the catalyst achieves, after passing through the $T_{50}$ at 175° C., a maximum nitrogen oxide conversion of 74% at 240° C. Above 350° C., the nitrogen oxide conversions observed decrease significantly and above 380° C. go below values of 66%. Even at lower temperature, the $N_2O$ concentrations resulting from overoxidation of ammonia increase to above 25 ppm.

Accordingly, the conversion profile in the sense of this patent application which is typical for VK2 encompasses the temperature range of from 175° C. to 310° C. denoted by (=).

FIG. 1 shows very clearly the restriction of the working range typical of conventional SCR catalysts which is due to the conflict of objectives between the minimum oxidizing force required for effective preoxidation of NO to $NO_2$ and the maximum usable oxidizing force which is still just permissible in order to prevent overoxidation of the ammonia used as reducing agent.

EXAMPLE 1

Conversion profile and aging behavior of two structured SCR catalysts according to the invention having a vertical arrangement of material zones were examined. To produce the catalyst, a catalytically active coating comprising two material zones was applied to an inert ceramic honeycomb body. For this purpose, the honeycomb body was firstly provided with a material zone comprising a copper-exchanged zeolite corresponding to catalyst VK 2 from comparative example 2 and calcined at 500° C. in air for 2 hours to improve adhesion of the coating. A further material zone comprising an iron-exchanged zeolite corresponding to VK 1 from comparative example 1 was subsequently applied. In this way, two catalysts according to the invention having a vertical arrangement of material zones as shown in FIG. 3A and having a catalyst volume of 0.04 l were produced. Both catalysts had a cell count of 62 cells per cm² and a wall thickness of 0.17 mm. The significant difference between the two catalysts according to the invention was the ratio of the material zones indicated in the following table.

| Catalyst: | Ratio [lower material zone:upper material zone] |
| --- | --- |
| V1: | [5:16] |
| V2: | [16:5] |

In such an arrangement of the material zones, the exhaust gas to be purified firstly diffuses through the material zone which comprises iron-exchanged zeolite and has a conversion profile at relatively high temperatures. There, the SCR reaction occurs at operating temperatures above 350° C. After passing through this upper material zone, the gas reaches the underlying layer which comprises copper-exchanged zeolites in which any unreacted nitrogen oxides react with unreacted ammonia. This occurs particularly when the operating temperatures of the catalyst are still below 350° C.

The conversion profile of the two catalysts according to the invention was examined in the freshly produced state in a stationary model gas test. The test conditions chosen corresponded exactly to the conditions described in comparative example 1. FIG. 4 shows the result of the study.

Both catalysts according to the invention have a broader conversion profile or a conversion profile covering a greater range of the target working window than the comparative catalysts of comparative examples 1 and 2. V1 has a $T_{50}$ of 180° C. and thus a somewhat slower increase in the nitrogen oxide conversion in the low-temperature range than V2 with a $T_{50}$ of 160° C. The maximum conversion for V1 is 76% at 290° C., while that for V2 is 78% conversion at 240° C. The corresponding upper limits of the conversion range of 68% conversion for V1 and 70% conversion for V2 are 490° C. (V1) and 425° C. (V2). An $N_2O$ content downstream of the catalyst of more than 25 ppm is not observed.

The measured data indicate the conversion profile hatched with (|||) of from 180° C. to 490° C. for V1. The conversion profile of V2 characterized by (≡) encompasses the temperature range from 160° C. to 425° C.

Compared to the selected comparative catalysts from the two comparative examples, which represent the current prior art, both catalysts according to the invention displayed a conversion profile which was broadened or shifted to significantly lower temperatures. Compared to VK2, a significant broadening of the conversion profile is achieved. Compared to VK1, V1 achieves a broadening of the conversion profile in the measured temperature range which is relevant to use.

In addition to the conversion profile in the freshly produced state, the performance of these two catalysts after hydrothermal aging was examined. For this purpose, the catalysts V1 and V2 were subjected to synthetic aging in a furnace which had been heated to 700° C. and in which an atmosphere comprising 10% of oxygen and 10% of water vapor in nitrogen was present for a period of 48 hours. The two catalysts were subsequently tested again in the model gas unit under the conditions mentioned in comparative example 1. For comparison with conventional SCR catalysts, VK1 was subjected to the same treatment and testing. The result is shown in FIG. 5.

After hydrothermal aging, the catalysts according to the invention display, as expected, considerable decreases in nitrogen oxide conversion, especially below 350° C. This behavior is known from conventional SCR catalysts, as VK1 shows, and represents a general problem which has hitherto remained unsolved. The observed deterioration in performance of the catalysts according to the invention is, however, considerably greater than in the case of conventional catalysts. This can be attributed to adverse interactions between the two material zones, presumably to uncontrolled migration of transition metal atoms, which destroys selectivity. Such an interaction can be considerably decreased by making the contact areas between the material zones smaller.

Accordingly, a horizontal arrangement of the material zones is the preferred embodiment of the invention when, in particular, the catalysts are to be exposed to very high temperatures and water vapor contents in the exhaust gas.

EXAMPLE 2

In this example, a catalyst according to the invention having a horizontal arrangement of the material zones, as shown in FIG. 3D, was examined. For this purpose, an inert ceramic honeycomb body having a volume of 0.04 l and a cell count of 62 cells per $cm^2$ having a wall thickness of 0.17 mm was provided with a coating comprising two material zones. A material zone comprising an iron-exchanged zeolite was firstly applied to half of the length of the inert support body in a conventional dipping process. The as yet uncoated half was then provided with a material zone comprising copper-exchanged zeolite so that the two material zones were in contact without an overlap zone.

The conversion profile of the catalyst H1 produced in this way was examined in a stationary model gas test. This was carried out using the same test conditions as described in comparative example 1. The catalyst was installed in the model gas reactor in such a way that the material zone which contains the iron-exchanged zeolite and has the conversion profile located at higher temperatures had to be contacted first by the model gas flowing through. The result of the measurements is shown in FIG. 6.

The catalyst H1 according to the invention having a horizontal arrangement of the material zones achieves nitrogen oxide conversions of more than 40% at and above a temperature of 180° C. The maximum conversion of 81% is achieved at 440° C. after the conversion has gone through a conversion plateau at 79-80% from 300° C. upward. There is then a slight decrease in conversion, but this does not go below 72% in the temperature range examined up to 500° C. The nitrous oxide concentration measured downstream of the catalyst is generally less than 10 ppm.

This gives a conversion profile denoted by the hatched area for the catalyst measured from 180° C. to >500° C. This represents a considerable broadening of the conversion profile compared to conventional SCR catalysts, especially in the direction of the low-temperature region.

After conclusion of the conversion profile analysis in the freshly produced state, the catalyst H1 according to the invention was subjected together with a further catalyst VK1' produced as described in comparative example 1 to synthetic aging under hydrothermal conditions in a furnace. The duration of aging was 48 hours, and the temperature was 650° C. The atmosphere in the furnace comprises 10% by volume of oxygen and 10% by volume of water vapor in nitrogen. After aging, the two catalysts were examined in a stationary model gas test, with the test conditions described in comparative example 1 once again being used. The installation direction for catalyst H1 was again selected so that the model gas firstly had to flow through the material zone containing iron-exchanged zeolites.

The results of the study are shown in FIG. 7. As in the case of the results shown in example 1, a significant deterioration in the nitrogen oxide conversion in the low-temperature range, which is also known from conventional SCR catalysts such as VK1', was also observed for the catalyst H1 according to the invention having a horizontal arrangement of material zones. However, unlike the inventive structured SCR catalysts V1 and V2 from example 1, H1 can maintain or even slightly exceed the conversion level of VK' in the temperature range above 300° C. Below 300° C., H1 after aging shows significant conversion improvements compared to the conventional SCR catalyst. Thus, the horizontal arrangement of the material zones enables not only a broadened conversion profile in the fresh state but also an improvement in the aging stability under hydrothermal conditions to be achieved.

The invention claimed is:

1. A structured SCR catalyst for an SCR reaction for the reduction of nitrogen oxides in the lean exhaust gas from internal combustion engines using ammonia or a compound which can be decomposed into ammonia as reducing agent, which comprises
a plurality of SCR catalytically active material zone layers which are layered on a support body and are contacted in succession by the exhaust gas,
wherein the SCR material zone layers are layered on top of one another,
wherein the SCR material zone layers are distinguished by different conversion profiles of the SCR reaction and
wherein the SCR material zone layer which is contacted first by exhaust gas to be purified is the upper layer,
wherein the conversion profile of the upper layer lies at higher temperatures than the conversion profile of the material zone layer which is contacted subsequently by the exhaust gas to be purified, wherein the upper layer comprises iron-exchanged zeolites, and wherein the SCR material zone layer which is subsequently contacted by the exhaust gas to be purified comprises copper-exchanged zeolites.

2. The structured SCR catalyst as claimed in claim 1, which does not contain any platinum group metal.

3. The structured SCR catalyst as claimed in claim 2, wherein the conversion profile of the upper layer is in the temperature range from 350° C. to 500° C.

4. The structured SCR catalyst as claimed in claim 1, wherein the SCR material zone layer which is contacted subsequently by the exhaust gas to be purified is arranged between the upper layer and a honeycomb body used as the support body.

5. The structured SCR catalyst as claimed in claim 1, wherein the SCR material zone layer which is contacted subsequently by the exhaust gas to be purified is identical to a honeycomb body used as the support body.

6. The structured SCR catalyst as claimed in claim 1, wherein a further coating which acts as diffusion barrier to transition metal atoms is arranged between the SCR material zone layers.

7. The structured SCR catalyst as claimed in claim 6, wherein the coating comprises predominantly unexchanged zeolites ("H-zeolites") or ammonium-exchanged zeolites or combinations thereof.

8. An exhaust gas purification unit containing a structured SCR catalyst as claimed in claim 1.

9. A process for the removal of nitrogen oxides from lean exhaust gases from internal combustion engines using ammonia or a compound which can be decomposed into ammonia as reducing agent comprising passing said exhaust gases in contact with a structured SCR catalyst as claimed in claim 1.

* * * * *